Dec. 19, 1933.  M. FABIANO  1,940,121
CUTTING MACHINE
Filed Nov. 12, 1931  2 Sheets-Sheet 1

Inventor
Michele Fabiano
by Harold E. Col.
Attorney

Dec. 19, 1933.    M. FABIANO    1,940,121
CUTTING MACHINE
Filed Nov. 12, 1931    2 Sheets-Sheet 2

Inventor
Michele Fabiano
by Harold E Cole
Attorney

Patented Dec. 19, 1933

1,940,121

UNITED STATES PATENT OFFICE 1,940,121

CUTTING MACHINE

Michele Fabiano, Somerville, Mass.

Application November 12, 1931
Serial No. 574,579

6 Claims. (Cl. 12—88)

This invention relates to a cutting machine and more particularly to a machine for cutting or trimming leather and fiber lifts on the heels of shoes.

At the present time the cutting or trimming down of the outside edges of a top lift to correspond with the size of the heel is done by hand or by a form cutter, which methods are slow and result in unevenly cut lifts. One object of my invention has been to provide a cutting machine which will trim the heel lifts down evenly to the shape of, or at any desired angle to, the heel while fastened to a shoe or apart therefrom, in one continuous operation within a few seconds. Another object was to provide such a cutting machine that is safe to operate, certain in its work, and adjustable to do the various sizes of lifts. Still another object was to make the same machine serve as a cutter for leather top lifts and for fiber or rubber top lifts as well; by so arranging the two different cutters and guiding parts on the same main shaft that either or both could be done at the same time with the same machine.

The foregoing and other objects which will appear as the nature of the invention is better understood, may be accomplished by a construction, combination and operative arrangement of parts such as is disclosed by the drawings. The nature of the invention is such as to render it susceptible to various changes and modifications, and, therefore, I am not to be limited to the construction disclosed by the drawings; but am entitled to all such changes therefrom as fall within the scope of my claims.

Figures 1, 2:
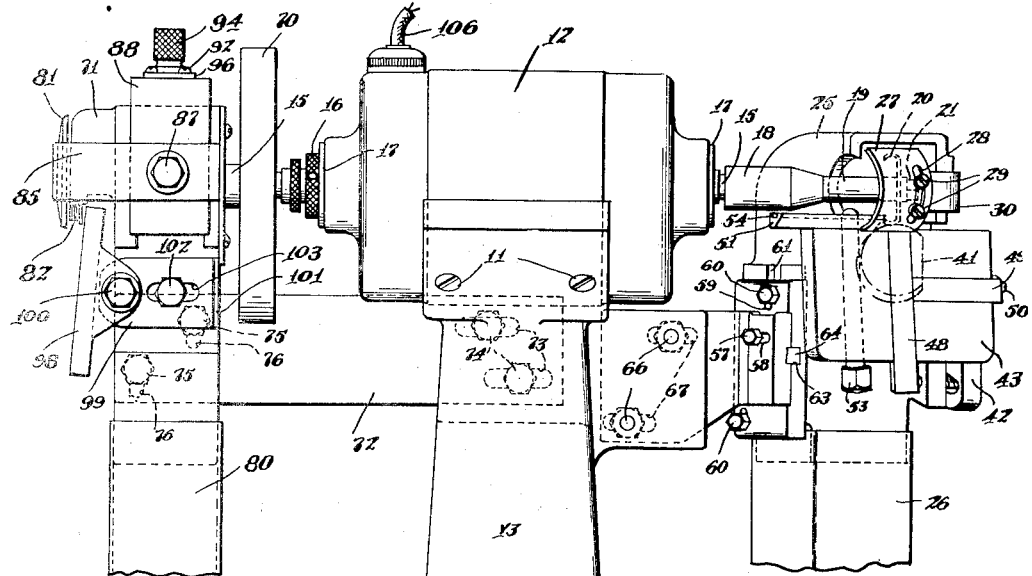
Figure 1 is a front elevation of my cutting machine.
Figure 2 is an end elevation showing the top leather lift cutting portion of my machine, the broken lines showing a heel with leather top lift in position to be cut or trimmed down to correspond with the rest of the heel.

As illustrated my cutting machine has a motor 12 supported by a standard 13 which is fastened to a bench 14. Connected to said motor 12 is a main shaft 15 extending from each side of said motor and driven at a very high rate of speed. I have found 7500 revolutions per minute a satisfactory speed. A gland nut 16 secures said shaft 15 and bearings 17 which are at each end of said motor, and on the right side of said motor is a stub shaft 18 mounted on said main shaft 15 on the reduced portion 19 of which stub shaft 18 is a cross-grain cutter 20 of the Busfield type held fast by a nut 21. This rotating cutter 20 is adapted to rapidly cut off the outer edge of a leather top lift 41 and trim it down to the size of the rest of the heel, leaving an even edge.

Figure 3:
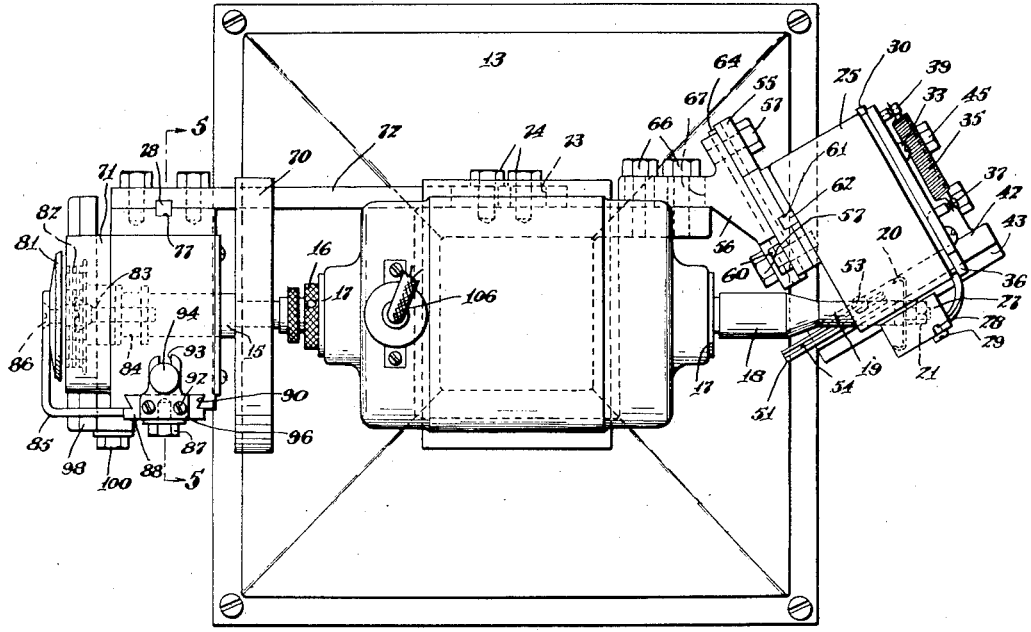
Figure 3 is a plan view of a complete machine.

In order to furnish proper support to the parts essential to this cutting operation a housing 25 is provided hollowed out to serve as a connection to a blower, not shown, and having a blower pipe 26 connected to it. Said housing is so positioned as to form an acute angle to said shaft 15 as illustrated in Figure 3 of the drawings. In order to determine the amount of the top lift 41 to be cut away a front guide 27, which serves as a safety guard as well, is provided in front of said cutter 20, which is preferably made arcuate although other shapes may be used. Said guide 27 has a longitudinal slot 28 therein to make it adjustable through which adjusting screws 29 pass, fastening it to an arm 30 which extends to the right side of said housing 25 slidably fitting in a groove 31 in said housing to permit said arm 30 to freely slide outwardly. A cover plate 32 keeps said arm 30 in said groove 31 and is itself held to said housing by screws 33. Said cover plate 32 has a slot 34 cut in from the front end, the back end of said slot serving as a stop to prevent said front guide 27 being pushed rearwardly beyond a predetermined point. A coil spring 35 is connected to said arm 30 by a small adjusting plate 36 which has a lug 37 struck out at its rear end to which one end of the spring 35 is fastened. A longitudinal slot 38 in said adjusting plate 36 makes possible the adjustment of said front guide 27 so that it may be made adaptable in trimming any thickness of top lift by merely setting a screw 24 in said slot 38 wherever desired, and screwing it into a hole in said arm 30. A fixed pin 39 at the rear end of said cover plate 32 holds the rear end of said spring 35, which spring serves to keep said front guide 27 in its proper place with relation to the cutter. A heel 40 has a top leather lift 41, portions of which extend beyond the edge of said heel 40 which portions will be cut off when the heel is positioned as illustrated in Figure 2 of the drawings.

An outside face plate 42 is fastened to said housing 25 by bolts 45, to which face plate 42 a tread rest member 43 is preferably made integral therewith. Two slots 44 in said face plate 42 through which said bolts 45 pass make a tread rest 43 adjustable vertically. Said tread rest 43 is preferably in a skewed position horizontally, slanting backwardly toward the outside as shown in Figure 3, thereby making it possible to cut all the way around a top lift in one continuous operation without having the shoe strike the motor or any other parts of the machine as it is moved around. This tread rest 43 not only steadies the heel and top lift during the cutting operation; but also makes it possible to cut the lift at an angle by properly positioning it at an angle, in the vertical plane of the machine.

In order to insure a clean, even cut of the lift 41 I provide a substantially vertical auxiliary rest 48 which fits into a vertical way in said tread rest 43 and in normal position extends slightly above the top close to the cutter 20, although it is made adjustable by a horizontal locking member 49 which fits in a horizontal way in said tread rest member 43 and abuts against said auxiliary rest 48, being secured in position by a screw 50 which is screwed tightly against it. Resting on the top of said tread rest 43 is a skiving knife 51 which remains stationary during the cutting operation, the bottom edge of the lift 41 coming in contact with it as it is turned by the operator thereby slightly beveling said edge, leaving it smooth. A long screw 53, having a separable head, extending from the bottom through said tread rest 43 holds said skiving knife 51 in place. Said long screw 53 has a portion milled out near the top end and said skiving knife has a channel 54 cut therein longitudinally and a side of said knife slidably fits in said milled out portion, thereby making said knife horizontally adjustable to any desired position.

An inside plate 55 is fastened to said housing 25 and is bolted to a bracket plate 56 by bolts 57, said bracket plate being directly fastened to said standard 13. A longitudinal horizontal slot 58 in said bracket plate 56 makes it possible to adjust said housing 25 horizontally frontwards, while a longitudinal vertical slot 59 in said inside plate 55 makes possible vertical adjustment of said housing by moving of bolts 60 which fastens said inside plate 55 to said housing.

At the inner side of said housing 25 and in said inside plate 55 is a vertical slot 61 in which a key 62 fits, and there is a horizontal slot 63 in which a key 64 fits in said inside plate 55 and said bracket plate 56 which slots and keys insure perfect alinement vertically and horizontally respectively.

Bolts 66 hold said bracket plate 56 to said standard 13 passing through longitudinal slots 67 in said bracket plate 56 which make the whole housing and parts directly connected thereto adjustable as a unit from left to right.

Mounted on the main shaft 15 is a fly wheel 70 at the left of which is a hollow housing 71 for a fiber cutter fastened to said standard 13 by a strap plate 72 in which longitudinal slots 73 are formed through which screws 74 pass and hold said plate 72 to said standard 13, said slots 73 making said fiber cutter housing 71 adjustable horizontally sidewise as a unit. At the front end of said strap plate 72 screws 75 pass through longitudinal vertical slots 76 in said plate 72 into said housing 71, making the housing as a unit adjustable vertically by reason of said slots 76. In the rear of said housing 71 and in said strap plate 72 is a vertical slot 77 in which a key 78 fits to insure perfect alinement between said housing 71 and said strap plate 72. At the bottom of said housing 71 a blower pipe portion 80 is formed.

Figure 4:
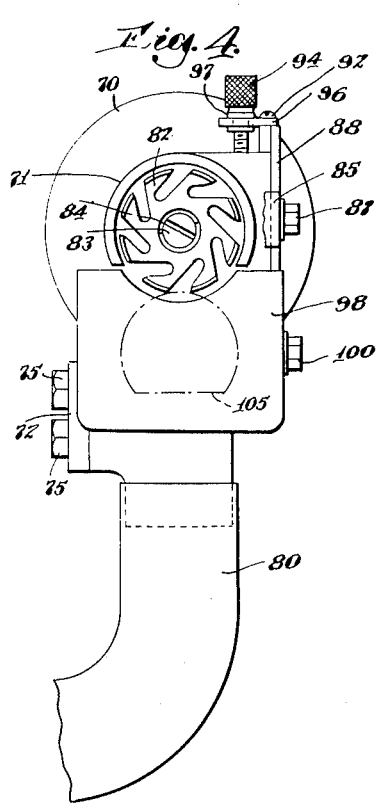
Figure 4 is an end elevation showing the fiber lift cutting portion of my machine, the broken lines showing a fiber lift in position to be cut or trimmed down.
Figure 5:
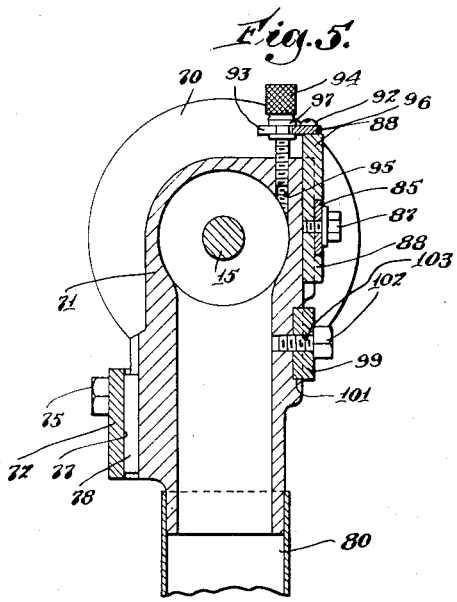
Figure 5 is a cross-section on the line 5—5 of Figure 3 showing the guide adjustment for the fiber lift cutter.

At the outside end of said fiber cutter housing 71 is a circular guide 81 which serves as a safety guard as well, the fiber heel or lift 105 to be cut being placed with the rand crease against the bottom edge of said guide 81 in the position illustrated in Figure 4 of the drawings, although said guide disc 81 is there omitted to show the rotary toothed-edge trimming cutter 82, which is fastened on said main shaft 15 by a screw 83 and a split bushing 84 in the end of said shaft 15. An arm 85 fastened to said guide disc 81 by a screw 86 holds said guide 81 in the desired position in front of said cutter 82 being fastened at its other end by a screw 87 to a vertical adjusting plate 88 which slides in a groove 90 formed in said housing 71. An ear 96 is fastened to said plate 88 at the top thereof by screws 92 there being an open end slot 93 in said ear 96 into which fits a portion of a thumb screw 94, said portion being between two washer like members 97 integral with said thumb screw 94. Said thumb screw fits into a threaded hole 95 in said housing 71 and as it is screwed up or down it raises or lowers said circular guide 81 as desired, depending upon how much of the heel lift it is desired to cut away.

Extending below said rotary cutter 82 is a tread rest member 98 on which the fiber heel 105 is rested during the cutting operation. This tread rest member 98 is fastened to an adjusting plate 99 by a screw 100 which pivotally holds said rest member 98 in position. Said plate 99 is slidable in a slot 101 in said housing 71, and a longitudinal slot 103 in said plate 99 through which a screw 102 passes and screws into said housing 71 makes said tread rest member 98 horizontally adjustable sidewise.

The motor 12 is connected to a source of power by a wire 106, and, of course, a pulley and belt, not shown, could be substituted for said motor.

In addition to cutting heel lifts very rapidly and evenly with absolute safety to the operator, my machine may be used simultaneously by two operators, one standing in front of the machine and cutting a leather lift 41 down to the correct shape with the cross-grain cutter 20, while the other operator stands at the end of the machine and cuts a rubber heel or other fiber lift 105 down to the correct shape, one machine and one shaft making this double operation possible, because the cutters, guides, tread rest members and other parts are particularly positioned to make this possible. The lifts may be so trimmed while attached to a heel separate from the shoe, or with the heel attached to the shoe, making this a very useful machine in shoe repairing shops where the operator must hold and turn the whole shoe during the cutting operation.

What I claim is:—

1. A cutting machine comprising a horizontal shaft, instrumentalities to support and rotate said shaft, cutting means on said shaft, a housing member supported by said instrumentalities extending rearwardly at an acute angle to the longitudinal axis of said shaft, a rest member on said housing member extending from a point adjacent said cutting means downwardly, and guide means in front of said cutting means supported by said housing member adapted to determine the position of the article to be cut with relation to said cutting means.

2. A cutting machine comprising a shaft, instrumentalities to support and rotate said shaft, cutting means on said shaft, a rest member adjacent to and extending downwardly below said cutting means and slanting rearwardly from left to right, guide means in front of and spaced from said cutting means, and means to support said rest member and guide means.

3. A cutting machine comprising a shaft, instrumentalities to support and rotate said shaft, cutting means on said shaft, a housing member supported by said instrumentalities at an acute angle to the longitudinal axis of said shaft, a rest member on said housing member adjacent to and extending downwardly below said cutting means, and an arcuate guide member supported by and extending from said housing member to a position in front of and spaced away from said cutting means.

4. In a heel-tap trimming machine, the combination with a rotary cutter, a horizontal shaft therefor, and a work support inclined in the same general direction as the longitudinal axis of the shaft extends and upon which the tap secured to the heel of a shoe is supported for swinging movement to transfer the point of operation of the cutter around the heel tap, of a shear blade mounted on the work support and having one end arranged to abut the path of the cutter.

5. In a heel-tap trimming machine, the combination with a rotary cutter, a horizontal shaft therefor, a work support, inclined in the same general direction as the longitudinal axis of the shaft extends and upon which the tap secured to the heel of a shoe is supported, having a tap engaged surface the adjacent end of which is spaced from the path of the cutter, and a cutter guard constructed to engage the heel and limit the distance the tap overhangs the adjacent edge of the work support, of a shear blade mounted to bridge the gap between the adjacent edge of the work support and the path of the cutter.

6. In a heel-tap trimming machine, the combination with a rotary cutter and a horizontal shaft therefor, said cutter cutting the tap substantially normal to the plane of the tap and tangential to the path of the cutter, of a work support, upon which the tap secured to the heel of a shoe is supported, having a tap engaged surface inclined in the same general direction as the longitudinal axis of the shaft and at such an angle thereto as to permit the forward part of the shoe to clear the machine as the point of operation of the cutter is transferred around the tap.

MICHELE FABIANO.